(12) United States Patent
Yun et al.

(10) Patent No.: US 11,527,338 B2
(45) Date of Patent: Dec. 13, 2022

(54) PATCH CORD INSPECTING SYSTEM

(71) Applicant: Talentis Corp., Gwangju (KR)

(72) Inventors: Seong Jin Yun, Gwangju (KR); Kyung Su Kim, Gwangju (KR); Hee Min Kim, Gwangju (KR)

(73) Assignee: TALENTIS CORP., Gwangju (KR)

( * ) Notice: Subject to any disclaimer, the term of this patent is extended or adjusted under 35 U.S.C. 154(b) by 0 days.

(21) Appl. No.: 17/446,486

(22) Filed: Aug. 31, 2021

(65) Prior Publication Data

US 2022/0068523 A1    Mar. 3, 2022

(30) Foreign Application Priority Data

Aug. 31, 2020 (KR) .................. 10-2020-0110310

(51) Int. Cl.
*H01B 11/22* (2006.01)
*G02B 6/38* (2006.01)
*G02B 6/44* (2006.01)

(52) U.S. Cl.
CPC ........... *H01B 11/22* (2013.01); *G02B 6/3817* (2013.01); *G02B 6/3895* (2013.01); *G02B 6/447* (2013.01)

(58) Field of Classification Search
None
See application file for complete search history.

(56) References Cited

U.S. PATENT DOCUMENTS

2018/0284364 A1* 10/2018 Scherer .................. G02B 6/387

FOREIGN PATENT DOCUMENTS

| JP | 2015045814 A | 3/2015 |
| JP | 2017116717 A | 6/2017 |
| KR | 101602621 B1 | 3/2016 |
| KR | 101879390 B1 | 7/2018 |
| KR | 20190031662 A | 3/2019 |

* cited by examiner

*Primary Examiner* — Chad H Smith
(74) *Attorney, Agent, or Firm* — Mark T. Vogelbacker; Eckert Seamans Cherin & Mellott, LLC (57) ABSTRACT

A patch cord identification inspection system includes a patch cord having first and second connectors, which are coupled to both end parts of an optical fiber cable and are detachably connected to predetermined electronic devices and in which first and second light-emitting diode (LED) modules are respectively embedded. The patch cord identification inspection system includes an identification inspector selectively slidably and detachably coupled to any one of the first and second connectors and configured to identify and inspect electrical connection states of the first and second connectors on the basis of lighting states of the first and second LED modules.

4 Claims, 13 Drawing Sheets

PATCH CORD INSPECTING SYSTEM

CROSS-REFERENCE TO RELATED APPLICATION

This application claims priority to and the benefit of Korean Patent Application No. 10-2020-0110310, filed on Aug. 31, 2020, the disclosure of which is incorporated herein by reference in its entirety.

BACKGROUND

1. Field of the Invention

Embodiments of the present invention relate to a patch cord identification inspection system, and more particularly, to a patch cord identification inspection system in which an identification inspector is easily attached to and detached from a patch cord so that convenience of use is significantly improved as compared to the related art, and furthermore, even when various functions are added to the identification inspector, a structure of the identification inspector is compact and an operation thereof is stably performed, thereby increasing the reliability of inspection.

2. Discussion of Related Art

A patch cord is an electrical or optical line that connects one electrical or optical device to another electrical or optical device for signal routing. In other words, the patch cord is an optical fiber cable having connectors provided at both ends and is used to connect communication lines between remote devices. For example, when large-scale communication facilities such as office buildings or apartments are required, a main distribution frame (MDF), which is a unit for connecting an external line and an internal line, may be installed, devices such as a fiber distribution frame (FDF) of an optical fiber cable, a software (SW) hub, and the like may be installed in the MDF, and patch cords may be used to connect communication lines between these devices.

As described above, the patch cords may be widely used for communication. In the case in which the patch cord is connected to the devices and then a patch cord number, for example, a cord line number, is intended to be checked, when the cord line number is not properly labeled, it is difficult to identify the corresponding patch cord.

In order to solve the above-described problem of identification, in the past, patch cords were individually labeled, or identification of patch cords was carried out using a tool like that in Korean Patent Application No. 10-2017-0119367. However, in the case of the related art including the above document, in consideration of the fact that convenience of use may be reduced due to a structural limitation and functions are somewhat lacking, it is necessary to develop a technique for solving the above problem.

DOCUMENT OF RELATED ART

Patent Document (Patent Document 0001) Korean Patent Application No. 10-2017-0119367

SUMMARY OF THE INVENTION

The present invention is directed to providing a patch cord identification inspection system in which an identification inspector is easily attached to and detached from a patch cord so that convenience of use is significantly improved as compared to the related art, and furthermore, even when various functions are added to the identification inspector, a structure of the identification inspector is compact and an operation thereof is stably performed, thereby increasing the reliability of inspection.

According to an aspect of the present invention, there is provided a patch cord identification inspection system including a patch cord having first and second connectors which are coupled to both end parts of an optical fiber cable and are detachably connected to predetermined electronic devices and in which first and second light-emitting diode (LED) modules are respectively embedded, and an identification inspector selectively slidably and detachably coupled to any one of the first and second connectors and configured to identify and inspect electrical connection states of the first and second connectors on the basis of lighting states of the first and second LED modules.

The first and second connectors may respectively include first and second connector bottoms on which the first and second LED modules are mounted and to which the optical fiber cable is connected at one side thereof, first and second module protection housings coupled to the first and second connector bottoms so as to surround the first and second LED modules and configured to protect the first and second LED modules, and first and second connector tops which are disposed between the first and second LED modules and the first and second module protection housings and detachably coupled to one sides of the first and second connector bottoms.

First and second light emitting openings, through which light generated from the first and second LED modules disposed between the first and second connector tops and the first and second connector bottoms is emitted outward from the first and second connector tops, may be formed in the first and second connector tops.

In order to emit the light generated from the first and second LED modules disposed between the first and second connector tops and the first and second connector bottoms to an outside, the first and second connector tops may be made of a transparent or translucent material.

The identification inspector may include an inspector main body, electrical connection elastic terminal parts which are provided on the inspector main body and elastically electrically connectable to the first and second connectors, and a sliding coupling part which is provided on the inspector main body and slidably and detachably coupled to the first and second connectors so as to allow the electrical connection elastic terminal parts to be electrically connected to the first and second connectors when being slidably coupled.

The sliding coupling part may include sliding coupling rails formed in the inspector main body in a direction in which the identification inspector is coupled, and sliding coupling rail grooves may be formed in the first and second connectors so that the sliding coupling rails may be slidably engaged with the sliding coupling rail grooves.

In the first and second connectors, entry slope guides for guiding sliding entry of the sliding coupling rails may be formed at entrances of the sliding coupling rail grooves.

The identification inspector may further include a main printed circuit board (PCB) which is provided in the inspector main body and connected to the electrical connection elastic terminal parts through lines, a battery which is provided on one side of the main PCB in the inspector main body to be charged and is connected to the main PCB to supply power, and a power on/off switch which is connected to the main PCB, has one side provided to be exposed to the outside of the inspector main body, and supplies or releases power to the first and second LED modules of the first and second connectors through the electrical connection elastic terminal parts and the lines.

The patch cord identification inspection system may further include a system controller which is mounted on the main PCB and controls power to be supplied to the first and second LED modules of the first and second connectors when the power on/off switch is turned on.

The identification inspector may further include a switch indicator lamp which is provided on one side of the inspector main body and displays an operating state of the power on/off switch, a charging notification indicator lamp which is provided on the one side of the inspector main body and informs an operator of a charged state of the battery, and a full charge notification indicator lamp which is provided on the one side of the inspector main body and informs the operator of a fully charged state of the battery.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Specific structural and functional descriptions of embodiments of the present invention disclosed in this specification are only for the purpose of describing embodiments of the present invention, and the embodiments of the present invention may be embodied in various forms and are not to be construed as limited to the embodiments described in this specification.

While the embodiments of the present invention may be modified in various ways and take on various alternative forms, specific embodiments thereof are shown in the drawings and described in detail in this specification. There is no intent to limit the present invention to the particular forms disclosed. On the contrary, the present invention is to cover all modifications, equivalents, and alternatives falling within the spirit and scope of the appended claims.

It should be understood that, although the terms "first," "second," and the like may be used herein to describe various elements, the elements are not limited by the terms. The terms are only used to distinguish one element from another element. For example, a first element could be termed a second element, and, similarly, a second element could be termed a first element, without departing from the scope of the present invention.

It should be understood that when an element is referred to as being "connected" or "coupled" to another element, the element may be directly connected or coupled to another element or intervening elements may be present. In contrast, when an element is referred to as being "directly connected" or "directly coupled" to another element, there are no intervening elements. Other words used to describe the relationship between elements should be interpreted in a like fashion (i.e., "between" versus "directly between," "adjacent" versus "directly adjacent," and the like.).

The terminology used herein is for the purpose of describing particular embodiments only and is not intended to limit the present invention. As used herein, the singular forms "a" and "an" are intended to also include the plural forms, unless the context clearly indicates otherwise. It should be further understood that the terms "comprise," "comprising," "include," and/or "including," when used herein, specify the presence of stated features, integers, steps, operations, elements, parts, or combinations thereof, but do not preclude the presence or addition of one or more other features, integers, steps, operations, elements, parts, or combinations thereof.

Unless otherwise defined, all terms including technical and scientific terms used herein have the same meaning as commonly understood by one of ordinary skill in the art to which this invention belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

Hereinafter, embodiments of the present invention will be described in detail with reference to the accompanying drawings.

Figure 1:
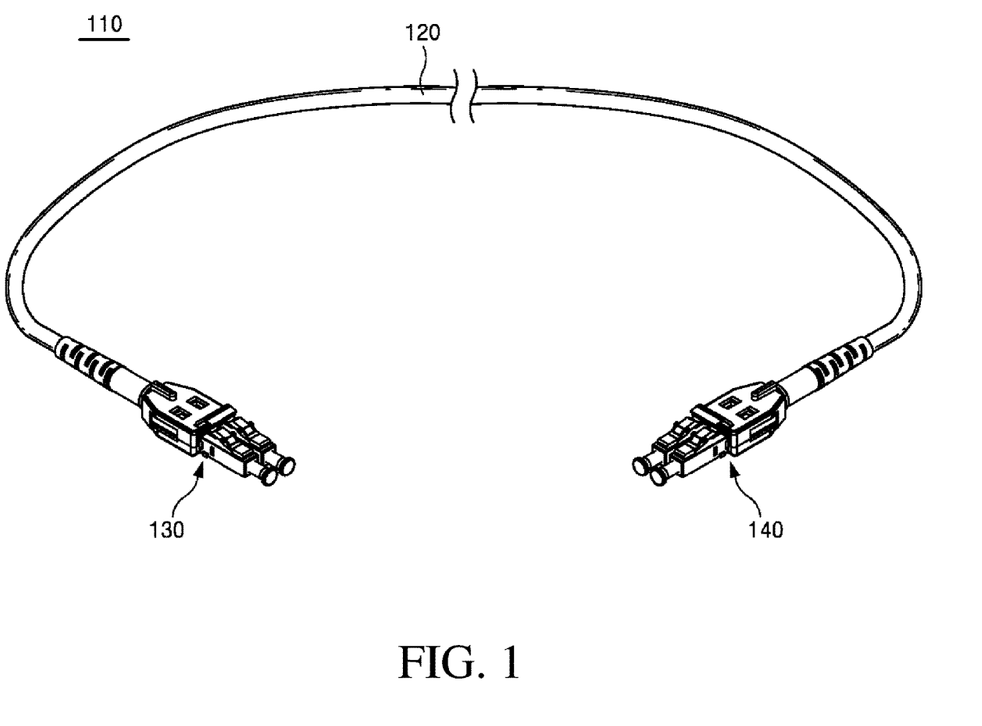
FIG. 1 is a structural diagram of a patch cord applied to a patch cord identification inspection system according to an embodiment of the present invention.
Figure 2:
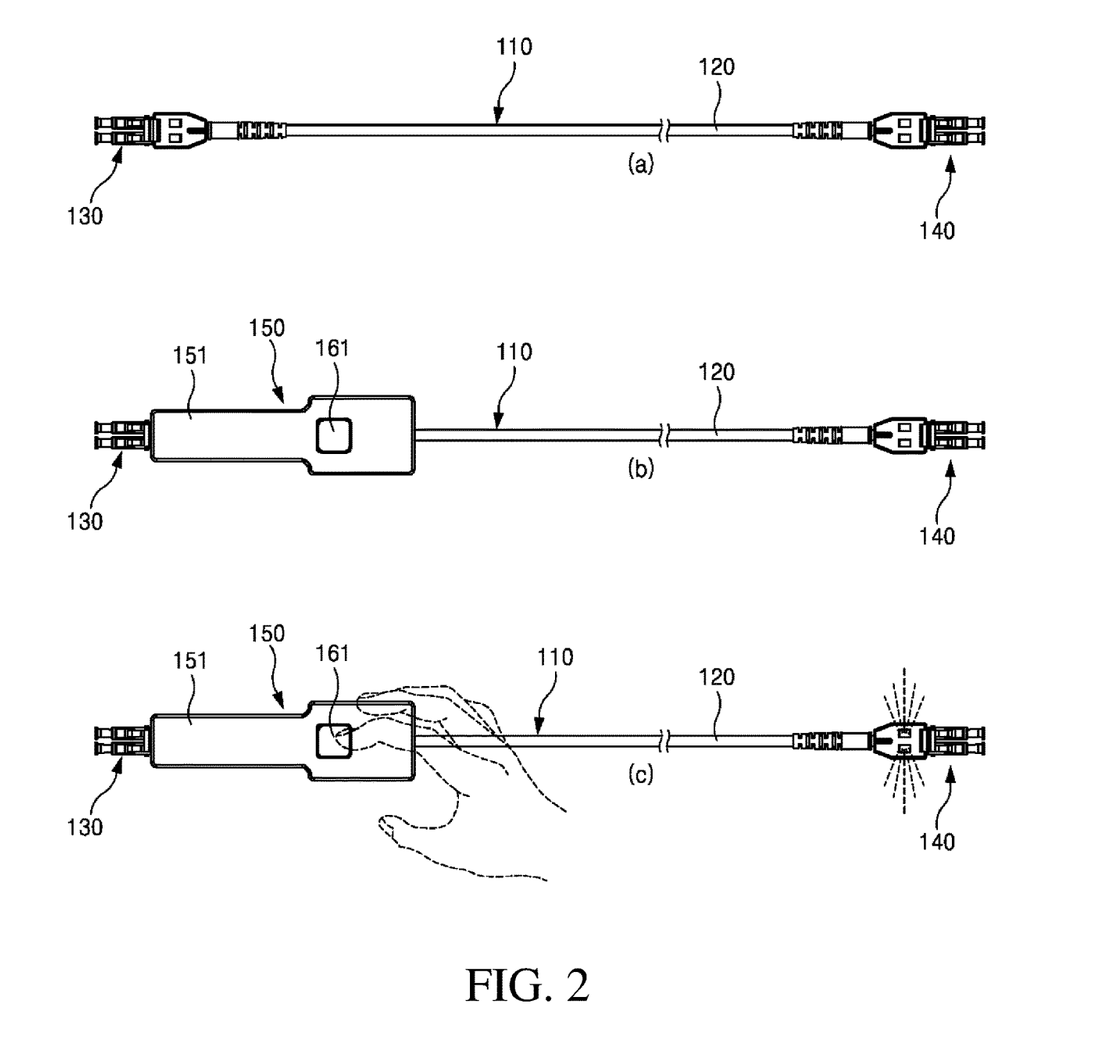
FIG. 2 illustrates views illustrating step by step use states of a patch cord identification inspection system according to an embodiment of the present invention.
Figure 3:
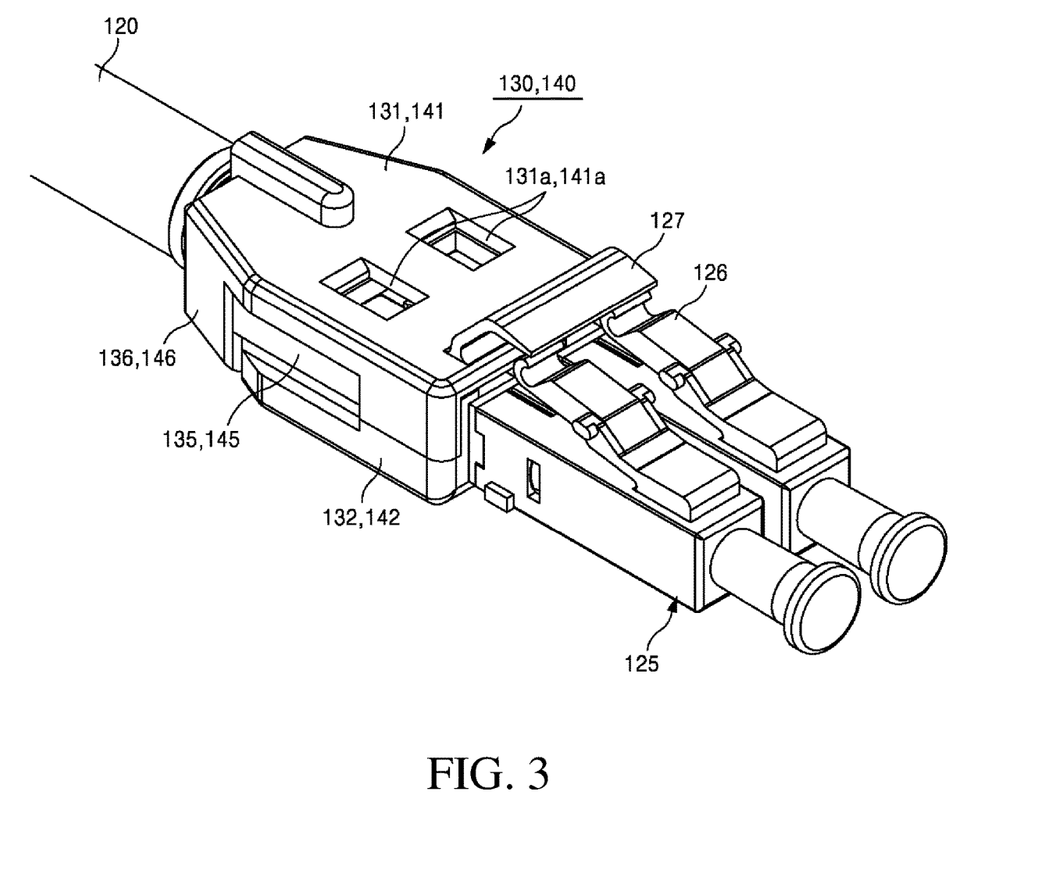
FIGS. 3 and 4 are views illustrating first and second connectors when viewed in different directions.
Figure 4:
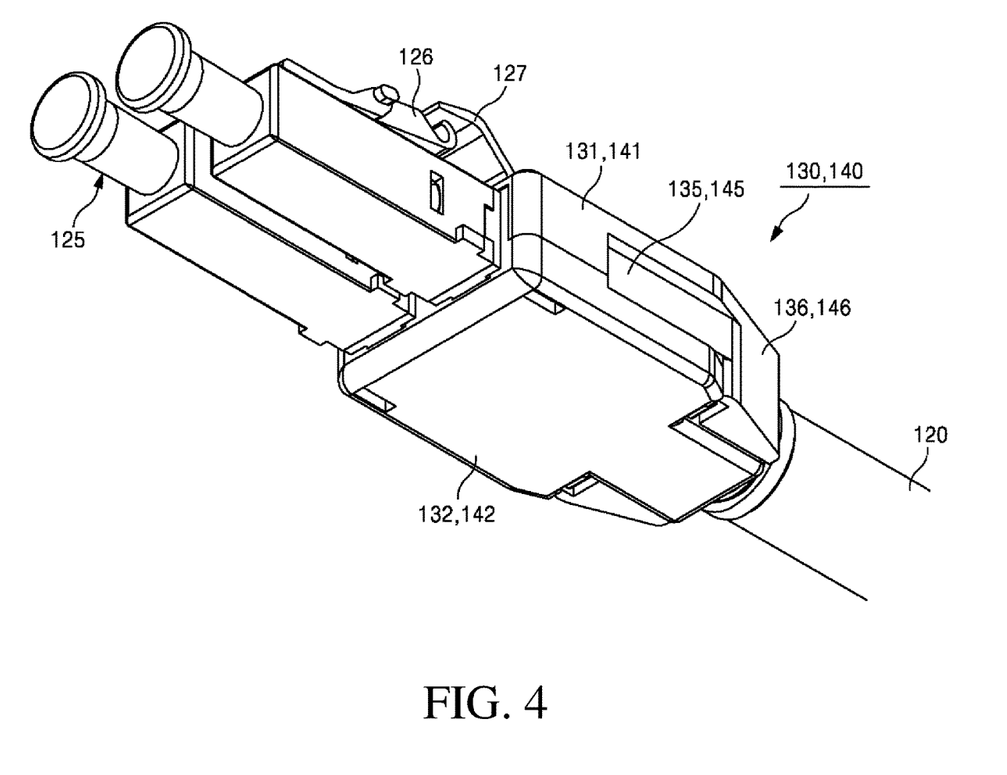
Figure 5:
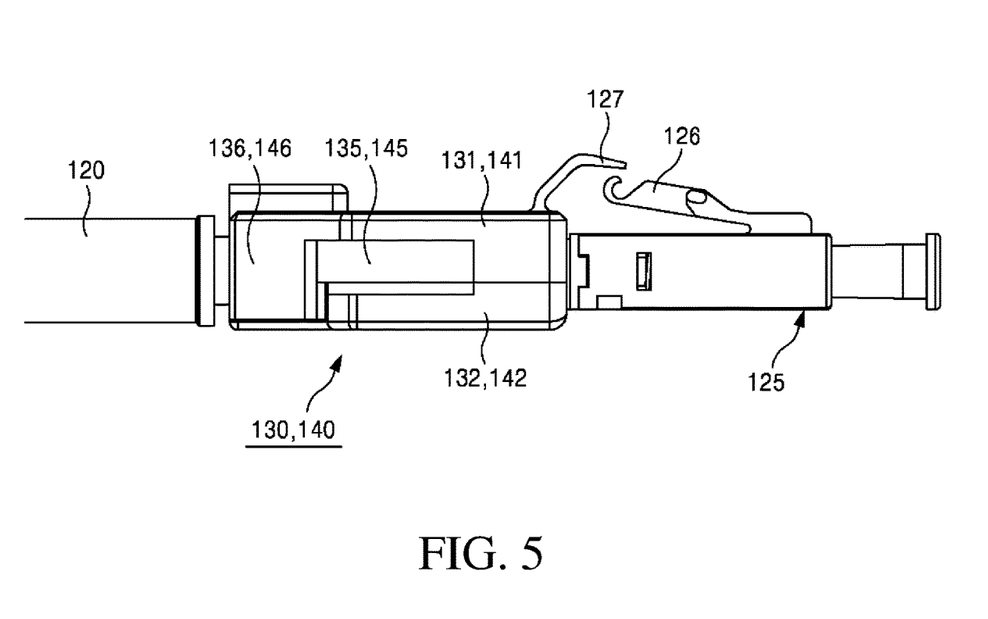
FIG. 5 is a side view illustrating the first and second connectors.
Figure 6:
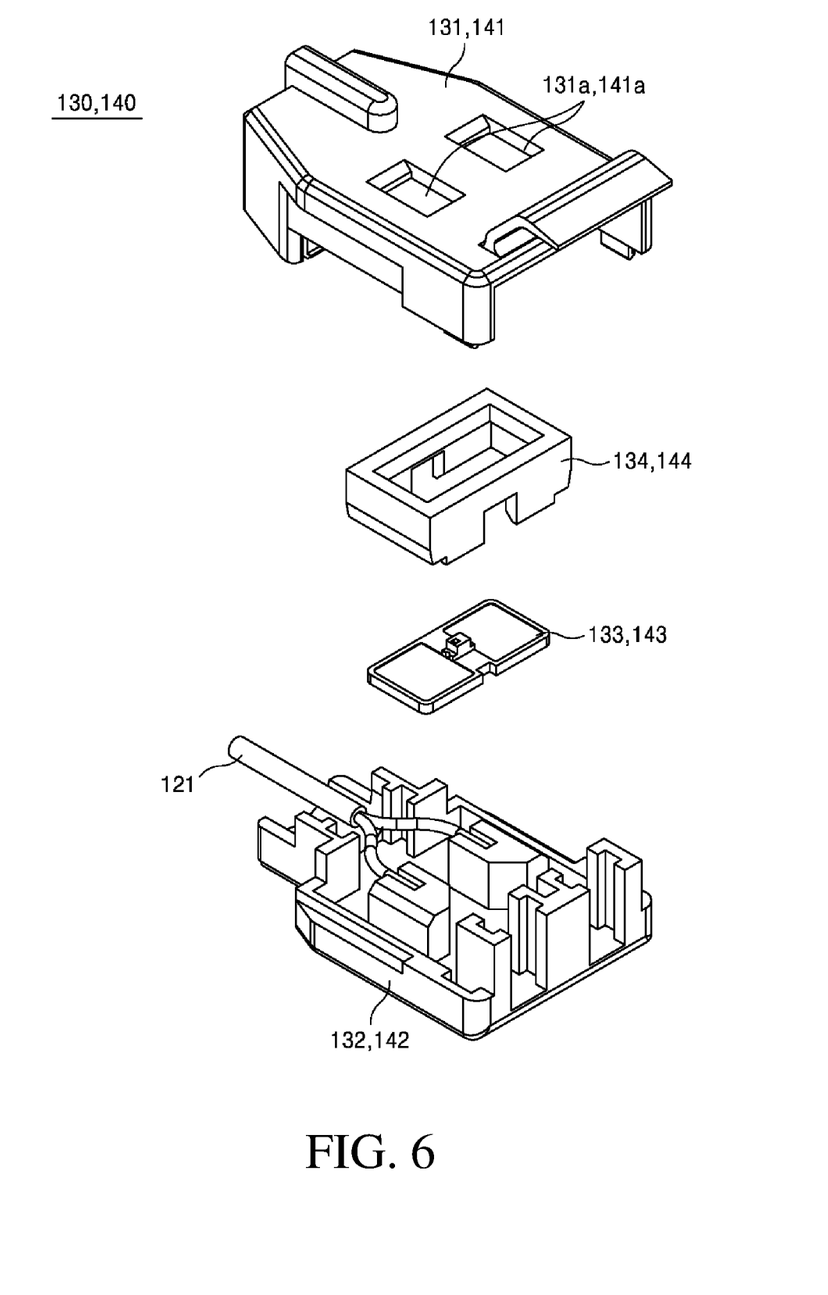
FIG. 6 is an exploded perspective view illustrating the first and second connectors.
Figure 7:
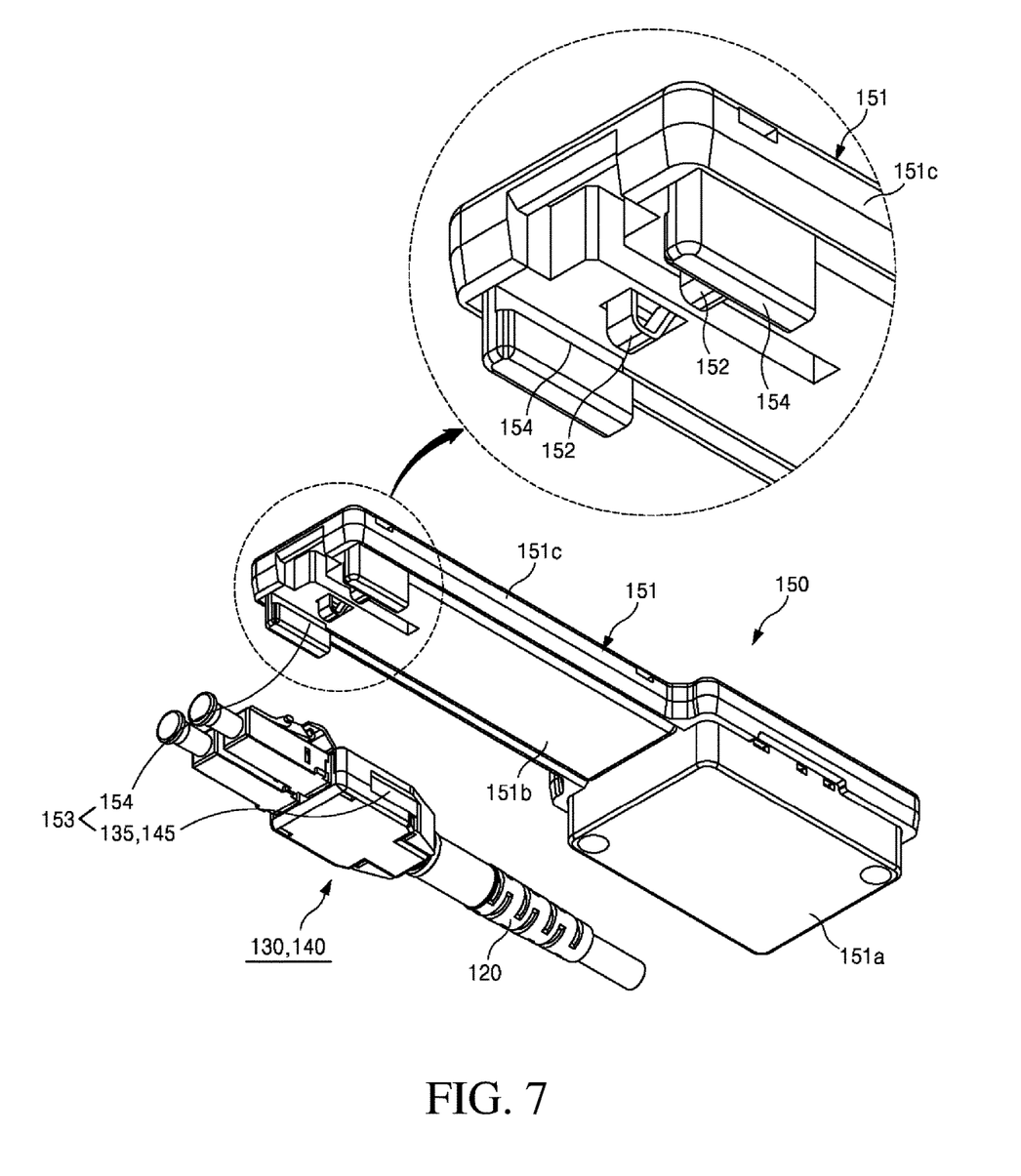
FIG. 7 is an exploded perspective view illustrating the first and second connectors and an identification inspector.
Figure 8:
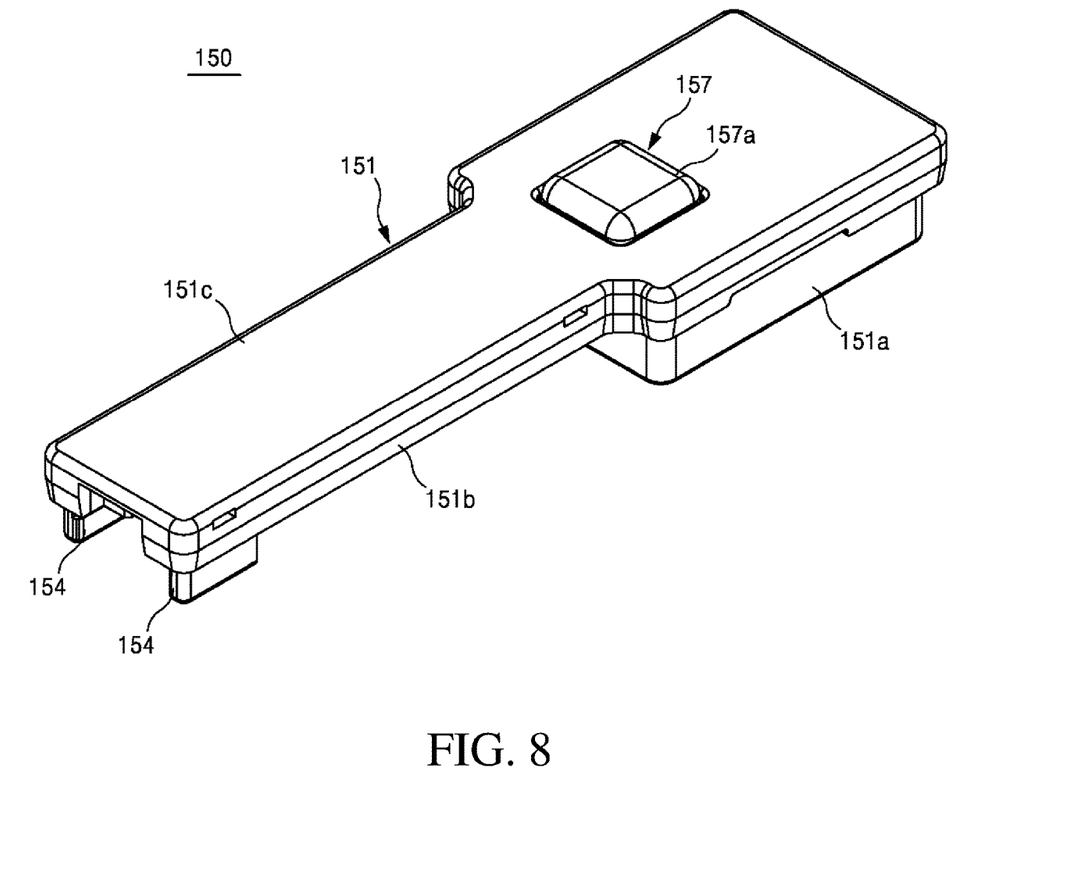
FIG. 8 is an enlarged perspective view of the identification inspector.
Figure 9:
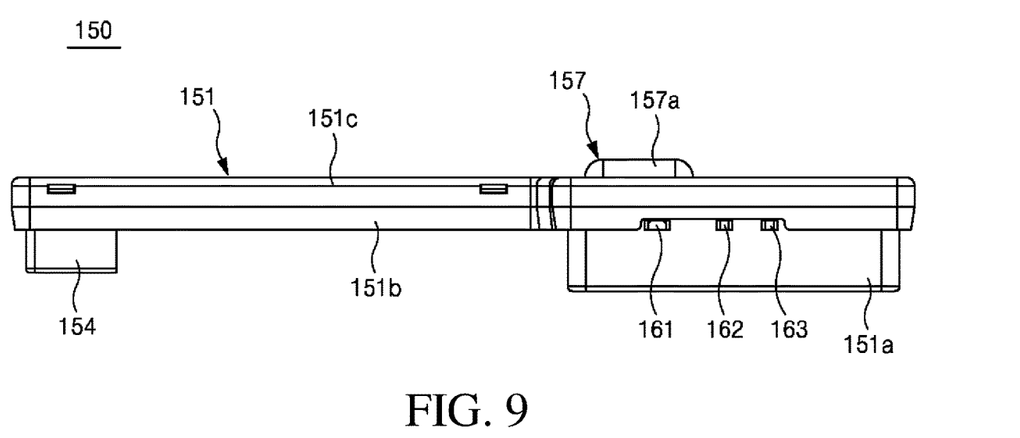
FIG. 9 is a side view of the identification inspector of FIG. 8.
Figure 10:
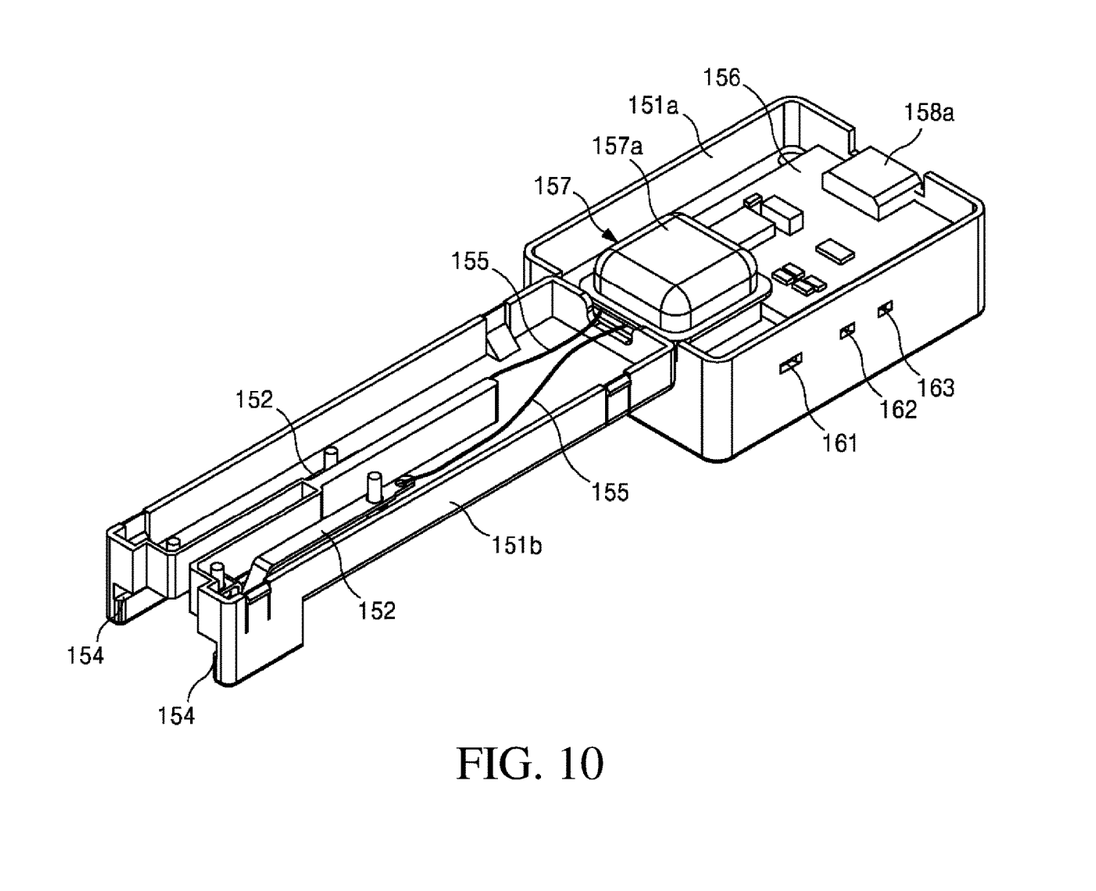
FIG. 10 is a view of the identification inspector in a state in which a cover housing of an inspector main body is removed in FIG. 8.
Figure 11:
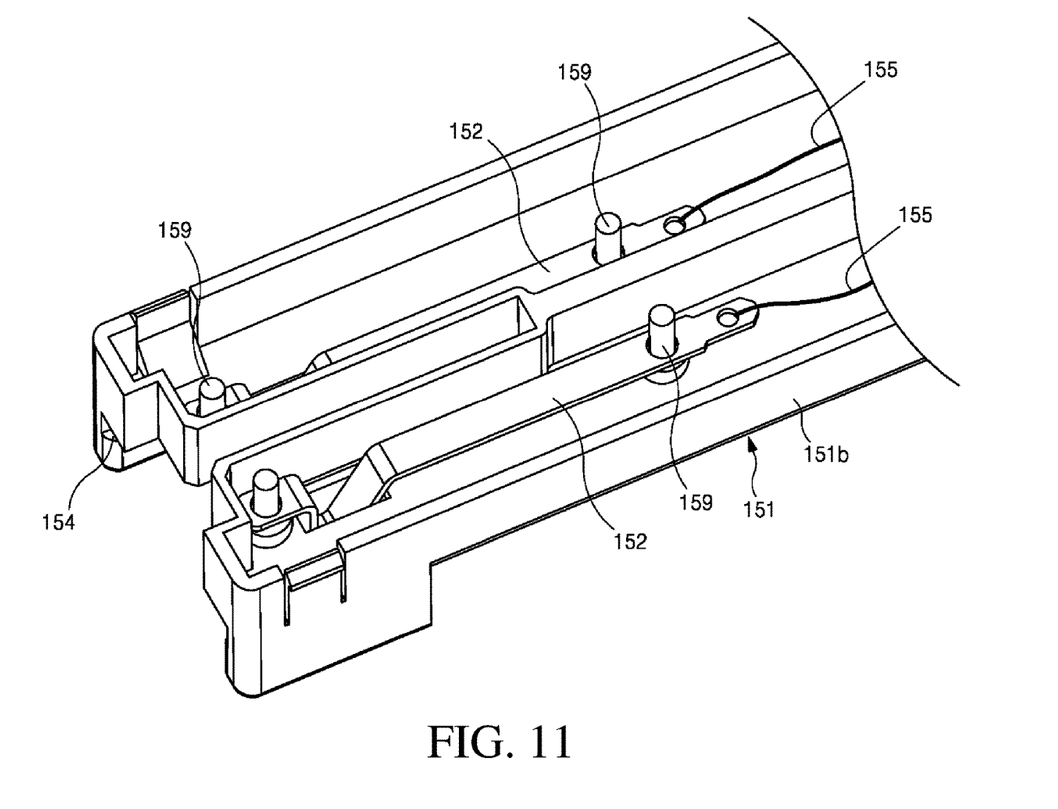
FIG. 11 is an enlarged view illustrating main parts of FIG. 10.
Figure 12:
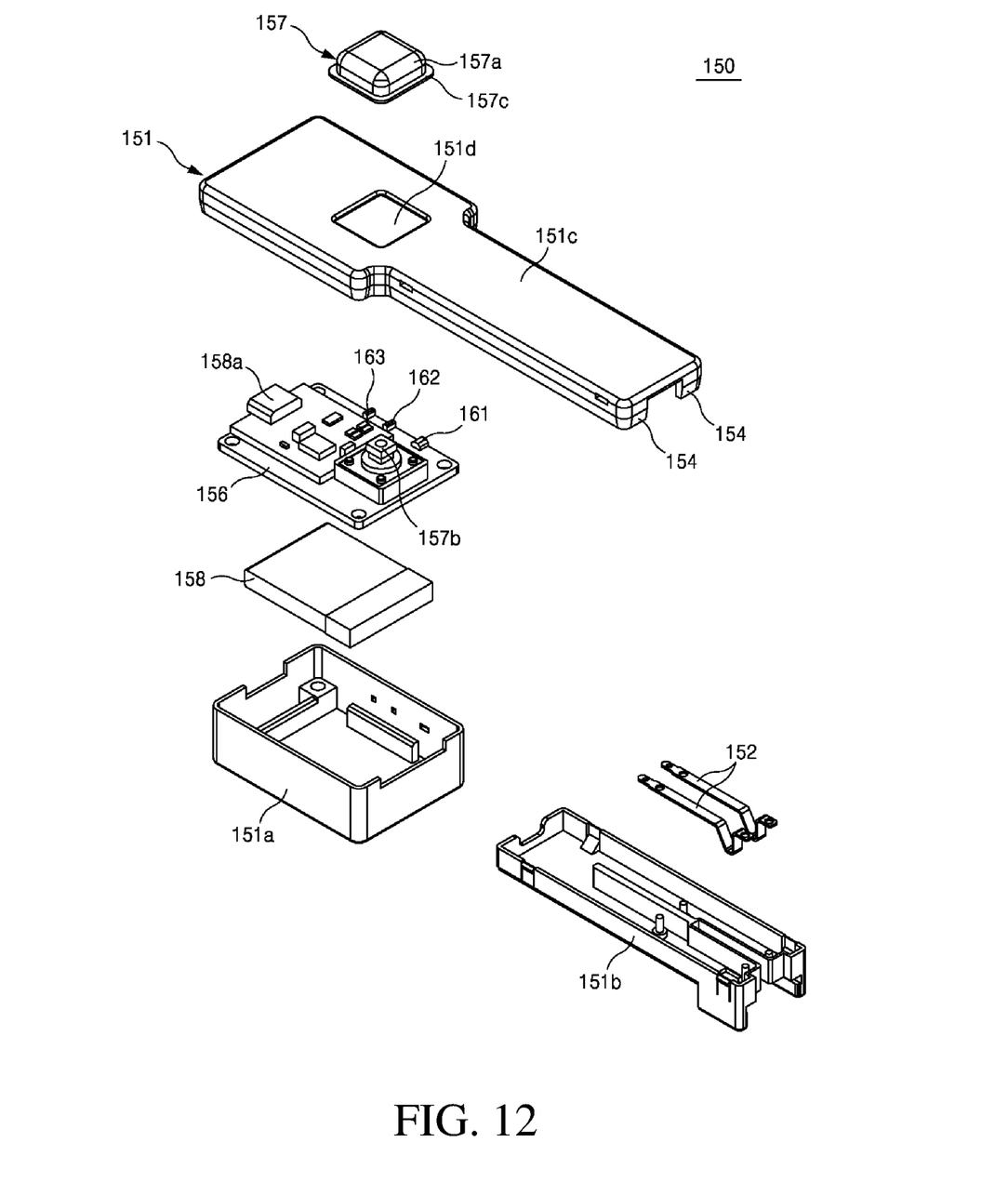
FIG. 12 is an exploded perspective view of the identification inspector of FIG. 8.
Figure 13:
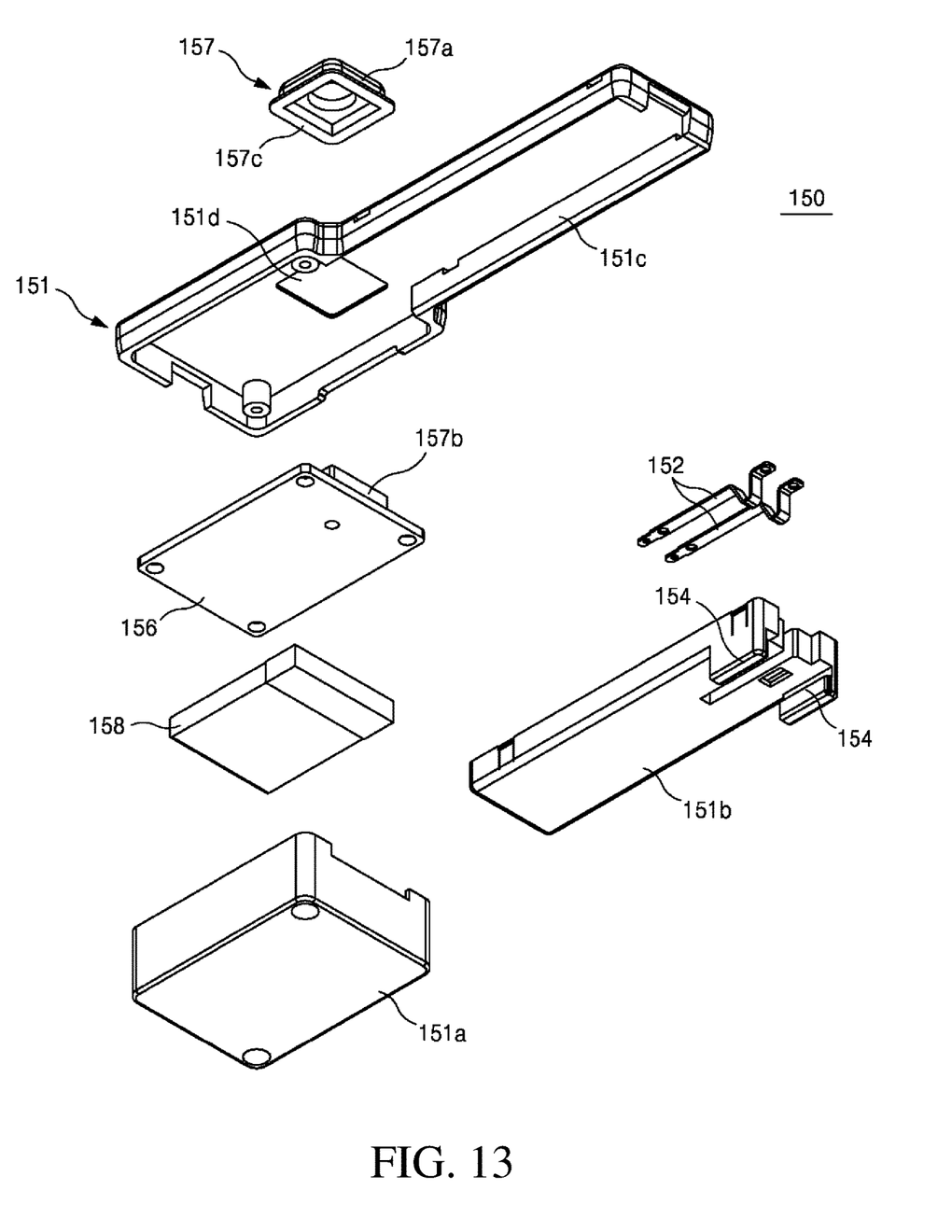
FIG. 13 is a rear view of the identification inspector of FIG. 12.
Figure 14:
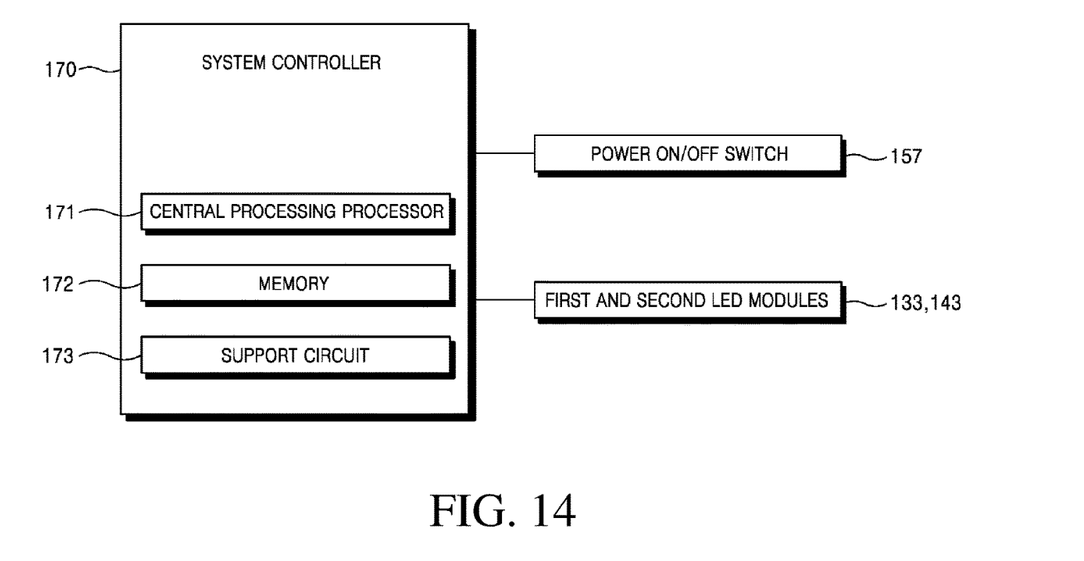
FIG. 14 is a control block diagram of a patch cord identification inspection system according to an embodiment of the present invention.

FIG. 1 is a structural diagram of a patch cord applied to a patch cord identification inspection system according to an embodiment of the present invention, FIG. 2 illustrates views illustrating step by step use states of the patch cord identification inspection system according to the embodiment of the present invention, FIGS. 3 and 4 are views illustrating first and second connectors when viewed in different directions, FIG. 5 is a side view illustrating the first and second connectors, FIG. 6 is an exploded perspective view illustrating the first and second connectors, FIG. 7 is an exploded perspective view illustrating the first and second connectors and an identification inspector, FIG. 8 is an enlarged perspective view of the identification inspector, FIG. 9 is a side view of the identification inspector of FIG. 8, FIG. 10 is a view of the identification inspector in a state in which a cover housing of an inspector main body is removed in FIG. 8, FIG. 11 is an enlarged view illustrating main parts of FIG. 10, FIG. 12 is an exploded perspective view of the identification inspector of FIG. 8, FIG. 13 is a rear view of the identification inspector of FIG. 12, and FIG. 14 is a control block diagram of the patch cord identification inspection system according to the embodiment of the present invention.

Referring to the drawings, the patch cord identification inspection system according to the present embodiment may roughly include a patch cord 110 and an identification inspector 150 and may allow the patch cord 110 to be easily identified using the identification inspector 150.

Particularly, in the case of the present embodiment, unlike the related art, the identification inspector 150 may be easily attached to or detached from the patch cord 110 so that convenience of use may be significantly improved as compared to the related art.

In addition, even when various functions are added to the identification inspector 150, a structure of the identification inspector 150 may be compact and an operation thereof may be stably performed, thereby increasing the reliability of inspection.

A detailed structure of the patch cord identification inspection system according to the present embodiment that provides such an effect will be described in detail.

First, the patch cord 110 is an electrical or optical line that connects one electrical or optical device to another electrical or optical device for signal routing.

In other words, the patch cord 110 is used to connect communication lines between remote devices. The patch cord 110 is referred to as a patch cable or a patch lead, and the patch cord, the patch cable, and the patch lead are regarded as the same term.

The patch cord 110 may include a flexible optical fiber cable 120 and first and second connectors 130 and 140 which are coupled to both end parts of the optical fiber cable 120 and detachably connected to predetermined electronic devices.

In the present invention, as the first and second connectors 130 and 140 are coupled to both end parts of the optical fiber cable 120 to form one unit as the patch cord 110, the connectors 130 and 140 are described separately as first and second connectors. However, only positions of the first and second connectors 130 and 140 are different and structures thereof are identical to each other.

The first and second connectors 130 and 140 may respectively include first and second light-emitting diode (LED) modules 133 and 143, first and second connector bottoms 132 and 142, first and second module protection housings 134 and 144, and first and second connector tops 131 and 141.

The first and second LED modules 133 and 143 each are a type of lamp for identification of the patch cord 110 and are respectively mounted on the first and second connector bottoms 132 and 142. The first and second LED modules 133 and 143 may each include both of a printed circuit board (PCB) and a substantial sensor.

The first and second connector bottoms 132 and 142 are injection-molded units in which the first and second LED modules 133 and 143 are mounted and to which the optical fiber cable 120 is connected to one sides thereof.

The optical fiber cable 120 includes an optical fiber auxiliary cable 121 that is coupled to the first and second connector bottoms 132 and 142 while being directly fitted into the first and second connector bottoms 132 and 142. As illustrated in FIG. 6, the optical fiber cable 120 may be manufactured in a form in which the optical fiber auxiliary cable 121 is coupled to the first and second connector bottoms 132 and 142 through the first and second connector bottoms 132 and 142 and an exterior of the optical fiber auxiliary cable 121 is covered. The optical fiber cable 120 is electrically connected to the first and second LED modules 133 and 143. The first and second LED modules 133 and 143 respectively implemented inside the first and second connectors 130 and 140 are electrically connected to each other through the optical fiber cable 120 to form a circuit. Therefore, when the identification inspector 150 is slidably coupled to the first connector 130 and then a power on/off switch 157 provided on the identification inspector 150 is pressed, power provided from the identification inspector 150 may be supplied to the first and second LED modules 133 and 143 and the first and second LED modules 133 and 143 may be turned on.

The first and second module protection housings 134 and 144 are structures that are coupled to the first and second connector bottoms 132 and 142 so as to surround the first and second LED modules 133 and 143 and serve to protect the first and second LED modules 133 and 143.

The first and second connector tops 131 and 141 are injection-molded units that are disposed between the first and second LED modules 133 and 143 and the first and second module protection housings 134 and 144 and detachably coupled to one sides of the first and second connector bottoms 132 and 142.

In the first and second connector tops 131 and 141, first and second light emitting openings 131a and 141a, through which light generated from the first and second LED modules 133 and 143 disposed between the first and second connector tops 131 and 141 and the first and second connector bottoms 132 and 142 is emitted outward from the first and second connector tops 131 and 141, are formed. That is, when the operation of the first and second LED modules 133 and 143 is turned on, the light generated from the first and second LED modules 133 and 143 may be emitted to the outside through the first and second light emitting openings 131a and 141a of the first and second connector tops 131 and 141, and identification may be performed through such a process.

The above process will be described in more detail. For example, when the identification inspector 150 is slidably coupled to the first connector 130 of FIG. 2A as illustrated in FIG. 2B and then the power on/off switch 157 provided on the identification inspector 150 is pressed, the power provided from the identification inspector 150 is transmitted to the first and second connectors 130 and 140 so that, in particular, the operation of the second LED module 143 of the second connector 140 is turned on as illustrated in FIG. 2C, and thus the light generated from the second LED module 143 is emitted to the outside through the second light emitting opening 141a of the second connector top 141. Therefore, an operator may easily, rapidly, and accurately identify the second connector 140, which is matched with the first connector 130, even when the operator is far away.

As described above, the optical fiber auxiliary cable 121 is coupled to one sides of the first and second connectors 130 and 140 including the first and second connector tops 131 and 141 and the first and second connector bottoms 132 and 142, and a terminal unit 125 for device connection is coupled to the other sides, that is, front end part regions.

The terminal unit 125 for device connection is substantially connected to a device such as communication equipment or the like. A hook part 126 is formed on the terminal unit 125 for device connection and a cover part 127 is provided on the first and second connectors 130 and 140 around the hook part 126. The hook part 126 is hooked to a device such as communication equipment or the like and the cover part 127 protects a hooked state of the hook part 126.

Meanwhile, the identification inspector 150 is selectively, slidably, and detachably coupled to any one of the first and second connectors 130 and 140 and serves to identify and inspect an electrical connection state of the first and second connectors 130 and 140 on the basis of a lighting state of the first and second LED modules 133 and 143.

That is, for example, when the identification inspector 150 is slidably coupled to the first connector 130 of FIG. 2A and is operated as illustrated in FIG. 2B, the operation of the second LED module 143 of the second connector 140 is turned on as illustrated in FIG. 2C so that the light from the second LED module 143 may be emitted to the outside through the second light emitting opening 141a of the second connector top 141, and the patch cord 110 may be easily identified through such a process. Particularly, even when the optical fiber cable 120 is very long and a patch cord 110 having several strands is disposed in the device such as the communication equipment or the like, in FIG. 2A, the patch cord 110 may be easily identified only by a simple process of coupling and operating the identification inspector 150 as illustrated in FIG. 2B, and thus an effect of the present invention may be more significantly obtained than in the related art.

For reference, in FIG. 2, the identification inspector 150 is described as being coupled to the first connector 130, but the identification inspector 150 may be coupled to the second connector 140 to identify the patch cord 110. However, it can be said that both of the above cases fall within the scope of the present invention.

The identification inspector 150 capable of providing the above effect includes an inspector main body 151 serving as an exterior structure, and the following components are mounted on the inspector main body 151 for each position.

The inspector main body 151 may be assembled and manufactured with a plurality of housings 151a to 151c. That is, the inspector main body 151 may include a main body housing 151a, a line housing 151b, and a cover housing 151c.

A main PCB 156, a battery 158, and the like which will be described below are mounted in the main body housing 151a. Electrical connection elastic terminal parts 152 and lines 155 are disposed in the line housing 151b. The line 155 of which one end part is connected to the electrical connection elastic terminal part 152 may be electrically connected to the main PCB 156 via the main body housing 151a and the line housing 151b.

A switch through-hole 151d for exposing a dome-shaped switch cover 157a of the power on/off switch 157 to the outside is formed in the cover housing 151c. A flange 157c is formed in the dome-shaped switch cover 157a so that the dome-shaped switch cover 157a is not completely separated through the switch through-hole 151d.

The electrical connection elastic terminal part 152 is coupled to the inspector main body 151. The electrical connection elastic terminal part 152 is disposed in the line housing 151b of the inspector main body 151 so that a position thereof is fixed as illustrated in FIG. 11, and one end part of the electrical connection elastic terminal part 152 is exposed at a lower side of the line housing 151b.

As illustrated in FIG. 11, a plurality of terminal installation rods 159 are provided in the line housing 151b. The electrical connection elastic terminal parts 152 may be disposed in the line housing 151b as a pair in the form of being coupled to the plurality of terminal installation rods 159.

The electrical connection elastic terminal part 152 has a certain elasticity. Therefore, when the identification inspector 150 is slidably coupled to, and particularly, is slidably engaged with, one of the first and second connectors 130 and 140, the electrical connection elastic terminal parts 152 may be stably and electrically connected to the first and second connectors 130 and 140 while being elastically deformed.

In order for the identification inspector 150 to be slidably coupled to one of the first and second connectors 130 and 140, a sliding coupling part 153 is provided in the inspector main body 151. The sliding coupling part 153 is slidably and detachably coupled to the first and second connectors 130 and 140 and serves to allow the electrical connection elastic terminal parts 152 to be electrically connected to the first and second connectors 130 and 140 when being slidably coupled.

The sliding coupling part 153 may include sliding coupling rails 154 formed in the inspector main body 151 in a direction in which the identification inspector 150 is coupled. The sliding coupling rails 154 may be slidably engaged with opposite side structures, that is, sliding coupling rail grooves 135 and 145 formed in the first and second connectors 130 and 140.

In the first and second connectors 130 and 140, entry slope guides 136 and 146 for guiding sliding entry of the sliding coupling rails 154 are formed at entrances of the sliding coupling rail grooves 135 and 145 so that the sliding coupling rails 154 are easily slidably engaged with the sliding coupling rail grooves 135 and 145.

As described above, the inspector main body 151 may be assembled and manufactured with the plurality of housings 151a to 151c. The structures such as the main PCB 156, the battery 158, the power on/off switch 157, and the like are attached to the main body housing 151a, which constitutes a box structure, among the plurality of housings 151a to 151c.

The main PCB 156 is a circuit connected to the electrical connection elastic terminal parts 152 through the lines 155. All of the structures such as the battery 158, the power on/off switch 157, and the like may be connected to the main PCB 156.

The battery 158 is provided on one side of the main PCB 156 in the main body housing 151a to be charged and is connected to the main PCB 156 to serve to supply power. In order to charge the battery 158, a battery charging terminal part 158a is provided on one side of the main PCB 156.

The power on/off switch 157 is connected to the main PCB 156 and has one side provided to be exposed to the outside of the inspector main body 151, and the power on/off switch 157 serves to supply or release power to the first and second LED modules 133 and 143 of the first and second connectors 130 and 140 through the electrical connection elastic terminal parts 152 and the lines 155.

The power on/off switch 157 includes the dome-shaped switch cover 157a and a tact switch module 157b which is mounted on the main PCB 156, as illustrated in FIGS. 13 and 14. The tact switch module 157b generates an on signal when the dome-shaped switch cover 157a is pressed one time and generates an off signal when the dome-shaped switch cover 157a is pressed once again.

In addition, a switch indicator lamp 161, a charging notification indicator lamp 162, and a full charge notification indicator lamp 163 are further mounted on the identification inspector 150. By mounting the above components, whether the device is operating may be easily determined or a charged state of the battery 158 or the like may be easily checked.

The switch indicator lamp 161 is provided on one side of the inspector main body 151 and displays an operating state of the power on/off switch 157. For example, when the power on/off switch 157 is pressed one time, the switch indicator lamp 161 is turned on.

The charging notification indicator lamp 162 is provided on the one side of the inspector main body 151 and serves to inform the operator of the charged state of the battery 158, and the full charge notification indicator lamp 163 serves to inform the operator of a fully charged state of the battery 158. The charging notification indicator lamp 162 and the full charge notification indicator lamp 163 may have different emission colors.

Meanwhile, in the system of the present embodiment, a system controller 170 is mounted to control the system. The system controller 170 may be mounted on the main PCB 156.

The system controller 170 serves to control power to be supplied to the first and second LED modules 133 and 143 of the first and second connectors 130 and 140 when the power on/off switch 157 is turned on.

The system controller 170 performing such a role may include a central processing processor (CPU) 171, a memory 172, and a support circuit 173.

In the present invention, the CPU 171 may be one of various computer processors that may be industrially applied to control power to be supplied to the first and second LED modules 133 and 143 of the first and second connectors 130 and 140 when the power on/off switch 157 is turned on.

The memory 172 is connected to the CPU 171. The memory 172 may be installed locally or remotely as a computer-readable recording medium and may be, for example, at least one memory that is easily available, such as a random access memory (RAM), a read only memory (ROM), a floppy disk, a hard disk, or any digital storage.

The support circuit 173 is coupled to the CPU 171 to support typical operations of the processor. The support circuit 173 may include a cache, a power supply, a clock circuit, an input/output circuit, a sub system, and the like.

In the present invention, the system controller 170 may control the power to be supplied to the first and second LED modules 133 and 143 of the first and second connectors 130 and 140 when the power on/off switch 157 is turned on, and such a series of control processes and the like may be stored in the memory 172. Typically, software routines may be stored in the memory 172. The software routines may be stored or executed by another CPU (not illustrated).

Although the processes according to the present invention are described as being performed by the software routines, at least some processes of the processes of the present invention may be performed by hardware. As described above, the processes of the present invention may be implemented with software executed on a computer system, implemented with hardware such as an integrated circuit, or implemented by a combination of software and hardware.

Hereinafter, an operation of the patch cord identification inspection system will be described.

First, for example, the identification inspector 150 is slidably coupled to the first connector 130 of FIG. 2A as illustrated in FIG. 2B. That is, when the identification inspector 150 is pushed against the first connector 130, the sliding coupling rails 154 of the identification inspector 150 may be guided along the first entry slope guide 136 of the first connector 130 and then may be engaged and coupled to the first sliding coupling rail groove 135.

In this case, the electrical connection elastic terminal parts 152 are electrically connected to the first connector 130 while being elastically pressed. That is, a pair of electrical connection elastic terminal parts 152 are brought into contact with the first LED module 133 of a circuit type through the first light emitting opening 131a, and thus the identification inspector 150 is electrically connected to the first connector 130.

In such a state, as illustrated in FIG. 2C, the power on/off switch 157 provided in the identification inspector 150 is pressed.

Then, the power provided from the identification inspector 150 is transmitted to the first and second connectors 130 and 140, and thus the operation of the second LED module 143 of the second connector 140 is turned on and the light generated from the second LED module 143 of the second connector 140 is emitted to the outside through the second light emitting opening 141a of the second connector top 141.

Therefore, the operator may easily, rapidly, and accurately identify the second connector 140, which is matched with the first connector 130, even when the operator is far away.

According to the present embodiment which is operated based on the structure as described above, the identification inspector 150 may be easily attached to or detached from the patch cord 110 so that convenience of use may be significantly improved as compared to the related art, and furthermore, even when various functions are added to the identification inspector 150, a structure of the identification inspector 150 may be compact and an operation thereof may be stably performed, thereby increasing the reliability of inspection.

Figure 15:
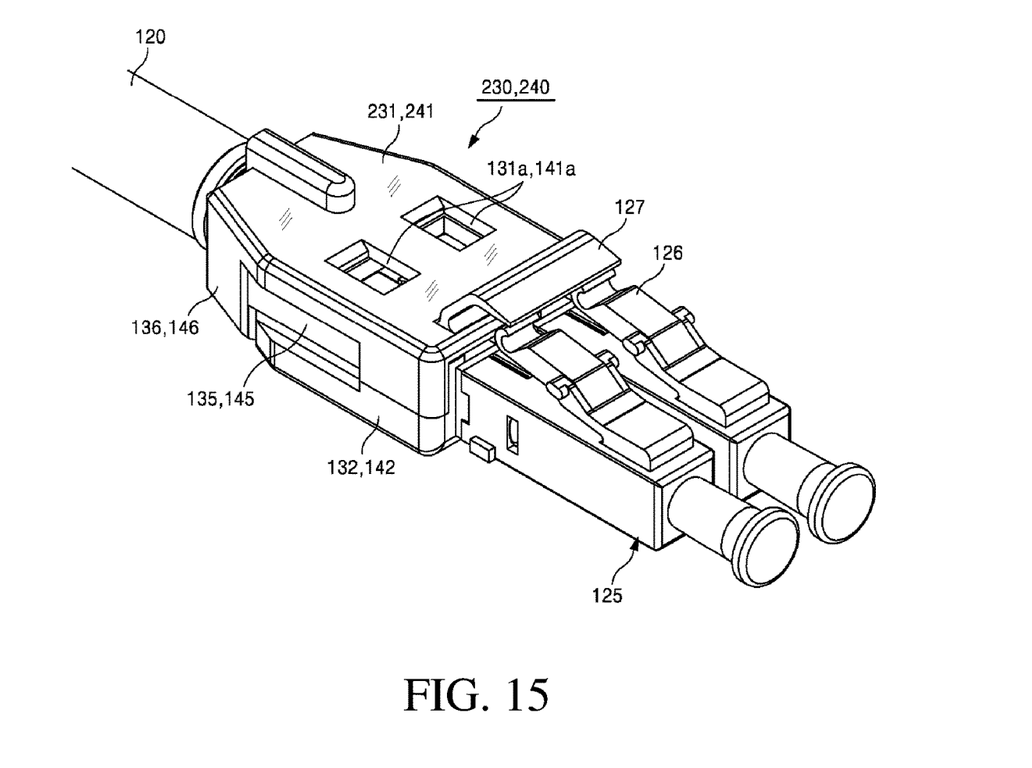
FIG. 15 is a perspective view illustrating first and second connectors applied to a patch cord identification inspection system according to another embodiment of the present invention.

FIG. 15 is a perspective view illustrating first and second connectors applied to a patch cord identification inspection system according to another embodiment of the present invention.

Referring to the drawing, in the case of first and second connectors 230 and 240 applied to the patch cord identification inspection system according to the present embodiment, first and second connector tops 231 and 241 are made of a transparent or translucent material.

In this case, when the operation of first and second LED modules 133 and 143 (see FIG. 6) is turned on, light generated from the first and second LED modules 133 and 143 is emitted to the outside through the first and second connector tops 231 and 241 made of the transparent or translucent material without change. Therefore, it is very advantageous for identification or inspection of a patch cord 110.

Even when the present embodiment is applied, an identification inspector 150 may be easily attached to or detached from the patch cord 110 so that convenience of use may be significantly improved as compared to the related art, and furthermore, even when various functions are added to the identification inspector 150, a structure of the identification inspector 150 is compact and an operation thereof is stably performed, thereby increasing the reliability of inspection.

According to the present invention, an identification inspector can be easily attached to or detached from a patch cord so that convenience of use can be significantly improved as compared to the related art, and furthermore, even when various functions are added to the identification inspector, a structure of the identification inspector can be compact and an operation thereof can be stably performed, thereby increasing the reliability of inspection.

As described above, the present invention is not limited to the described embodiments and it is apparent to those skilled in the art that various modifications and variations can be made without departing from the spirit and scope of the present invention. Therefore, it should be understood that such modifications or variations fall within the scope of the appended claims of the present invention.

What is claimed is:

1. A patch cord identification inspection system comprising:
 a patch cord having first and second connectors which are coupled to both end parts of an optical fiber cable and are detachably connected to predetermined electronic devices and in which first and second light-emitting diode (LED) modules are respectively embedded; and
 an identification inspector selectively slidably and detachably coupled to any one of the first and second connectors and configured to identify and inspect electrical connection states of the first and second connectors on the basis of lighting states of the first and second LED modules,
 wherein the first and second connectors respectively include:
 first and second connector bottoms on which the first and second LED modules are mounted and to which the optical fiber cable is connected at one side thereof;
 first and second module protection housings coupled to the first and second connector bottoms so as to surround the first and second LED modules and configured to protect the first and second LED modules; and
 first and second connector tops which are disposed between the first and second LED modules and the first and second module protection housings and detachably coupled to one sides of the first and second connector bottoms.

2. The patch cord identification inspection system of claim 1, wherein first and second light emitting openings, through which light generated from the first and second LED modules disposed between the first and second connector tops and the first and second connector bottoms is emitted outward from the first and second connector tops, are formed in the first and second connector tops.

3. The patch cord identification inspection system of claim 1, wherein, in order to emit light generated from the first and second LED modules disposed between the first and second connector tops and the first and second connector bottoms to an outside, the first and second connector tops are made of a transparent or translucent material.

4. A patch cord identification inspection system comprising:
 a patch cord having first and second connectors which are coupled to both end parts of an optical fiber cable and are detachably connected to predetermined electronic devices and in which first and second light-emitting diode (LED) modules are respectively embedded; and
 an identification inspector selectively slidably and detachably coupled to any one of the first and second connectors and configured to identify and inspect electrical connection states of the first and second connectors on the basis of lighting states of the first and second LED modules,
 wherein the identification inspector includes:
 an inspector main body;
 electrical connection elastic terminal parts which are provided on the inspector main body and elastically electrically connectable to the first and second connectors; and
 a sliding coupling part which is provided on the inspector main body and slidably and detachably coupled to the first and second connectors so as to allow the electrical connection elastic terminal parts to be electrically connected to the first and second connectors when being slidably coupled.

\* \* \* \* \*